(12) United States Patent
Malcolm

(10) Patent No.: US 9,285,946 B2
(45) Date of Patent: Mar. 15, 2016

(54) GENERATION OF A PROGRESS NOTIFICATION IN A SOFTWARE LOOP

(75) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 2497 days.

(21) Appl. No.: 12/040,047

(22) Filed: Feb. 29, 2008

(65) Prior Publication Data

US 2009/0222786 A1 Sep. 3, 2009

(51) Int. Cl.
*G06F 9/44* (2006.01)
*G06F 9/45* (2006.01)
*G06F 3/048* (2013.01)
*G06F 3/0481* (2013.01)

(52) U.S. Cl.
CPC .............. *G06F 3/0481* (2013.01); *G06F 8/443* (2013.01); *G06F 8/445* (2013.01)

(58) Field of Classification Search
USPC ................... 717/125, 144, 156, 160; 715/772
See application file for complete search history.

(56) References Cited

U.S. PATENT DOCUMENTS

| | | | | |
|---|---|---|---|---|
| 2002/0112225 A1* | 8/2002 | Charisius et al. | ............. | 717/125 |
| 2008/0216054 A1* | 9/2008 | Bates et al. | .................. | 717/125 |
| 2008/0269959 A1* | 10/2008 | Wakefield | .......................... | 701/1 |
| 2009/0118845 A1* | 5/2009 | Eldridge et al. | ................ | 700/86 |
| 2009/0164933 A1* | 6/2009 | Pederson et al. | .............. | 715/772 |

* cited by examiner

*Primary Examiner* — Don Wong
*Assistant Examiner* — Mohammad Kabir
(74) *Attorney, Agent, or Firm* — Lowenstein Sandler LLP

(57) ABSTRACT

Embodiments relate to systems and methods for generating a progress indicator in a programming loop. In embodiments, a programming language or application programming interface (API) can contain a loop operator that registers the occurrence of each iteration in a loop, and passes that information to a user interface to display an indicator of loop progress to a programmer or user. The progress notification can be a thermometer-style graph, a progress bar, or other graphical or other display representing the progress of the programming or process loop. In embodiments, the progress indicator and related information can be dumped to a log file, to create a record of loop progress to review and perform debugging operations, in the event of a crash during execution of the loop.

23 Claims, 5 Drawing Sheets

US 9,285,946 B2

GENERATION OF A PROGRESS NOTIFICATION IN A SOFTWARE LOOP

FIELD

The present teachings relates to systems and methods for generating a progress notification for a repetitive software process, and more particularly to platforms and techniques for automatically generating a progress bar or other indicator that displays the real-time progress in a software loop.

BACKGROUND OF RELATED ART

In the computer programming arts, it is common to incorporate a processing loop that repeats a computation or logical operation until some criterion is satisfied. For example, a loop can be set up to run a virus checker against a set of received email messages, one after the other, until the end of that inbox list is reached.

While that loop is being executed, however, there is no application programming interface or other programming construct built into available platforms to view the progress of the processing in the loop, other than manual debugging. Thus, a programmer or user invoking a loop to virus-check a set of emails as noted will have to wait until the received email list is exhausted before an indication that the loop is presented, or will have to prepare an additional portion of separate code to attempt to monitor loop progress. In the interval before the loop is complete, the programmer or user may not be able to determine how far into the received email list the virus check has proceeded, without preparing additional code simply for that purpose.

It may be desirable to provide methods and systems that can automatically generate a progress notification in a software loop as part of the programming syntax, application programming interface, or other platform or programming resource.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating a progress notification in a software loop. More particularly, embodiments relate to platforms and techniques including a loop progress decorator that can be inserted into a loop programming structure, and that can be used to detect and generate a graphical output representing the progress through the loop. The loop progress decorator can be an operator nested within conventional loop programming statements, and automatically register and track an increment counter used in the loop. The loop progress decorator can communicate the loop increment and other status information to a notification manager. The notification manager generates an output indicating the status of the loop execution to the programmer or user.

The notification manager can, for example, generate a graphical or visual output indicating the percentage or portion of the loop that has been completed. The graphical output can comprise, for example, an animated bar graph, bullet graph, thermometer bar, or other moving or dynamic graphical indicator which corresponds to the degree of completion of the loop as it executes. A programmer or user therefore can gain information about the progress of a loop or other repetitive software process, before that process is completed. The progress notification can be invoked and generated with the insertion of a dedicated programming instruction or function in the loop structure, without altering the loop structure or requiring the programmer to prepare significant additional code for such purposes. In embodiments, the notification manager can generate additional types of output besides a graphical progress bar, such as a printed output indicating the lines or repetitions of a loop, as each line or repetition is executed. In embodiments, the notification manager can capture and store further information regarding the execution of the client machine as the loop as executed, to assist in debugging or other activity. These and other embodiments described herein address the various noted shortcomings in known programming technology, and provide enhanced loop code tools and resources.

Reference will now be made in detail to exemplary embodiments of the invention, which are illustrated in the accompanying drawings. Where possible the same reference numbers will be used throughout the drawings to refer to the same or like parts.

Figure 1:
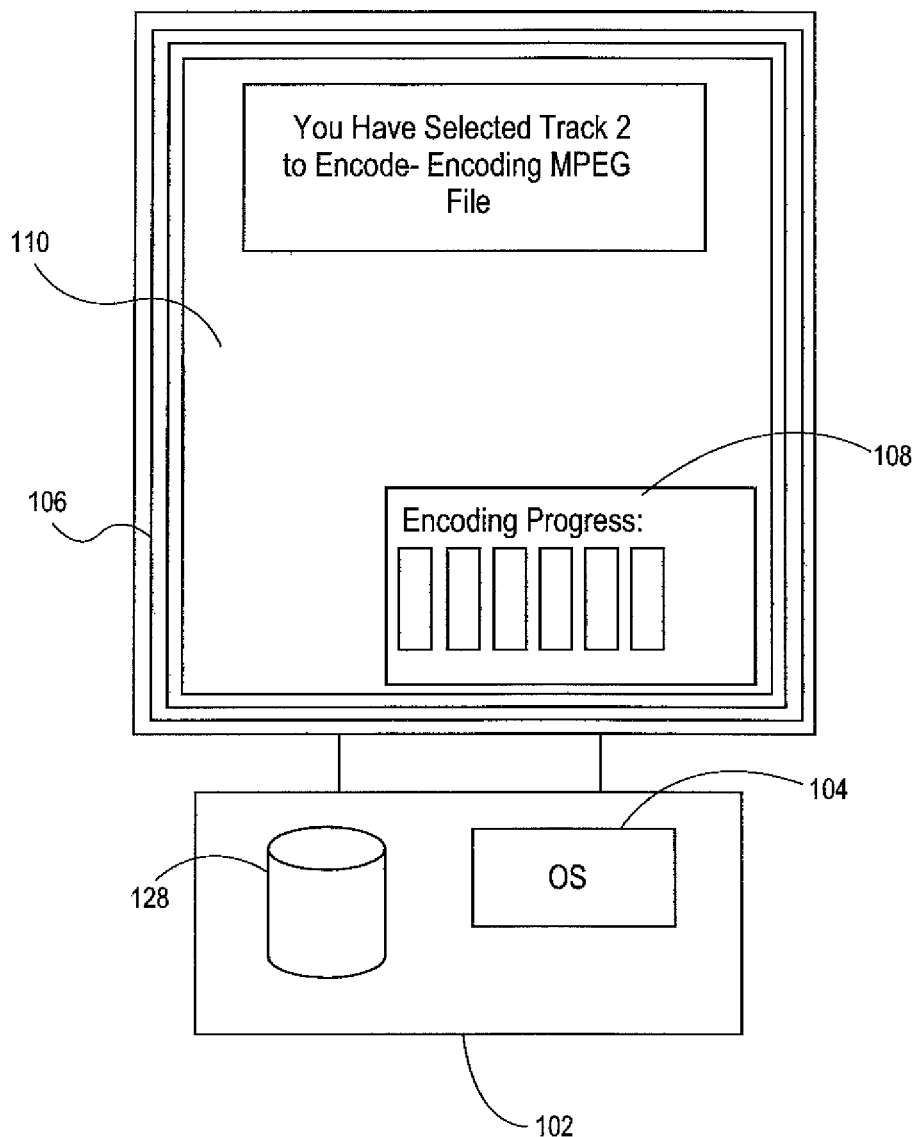
FIG. 1 illustrates an overall system for generating a progress notification in a software loop, according to various embodiments.

FIG. 1 illustrates an overall system, consistent with embodiments of the present teachings. In embodiments as shown, a user can operate one or more application 110 on a client 102 to perform desired tasks. Application 110 can be a word processing program, an email client, a Web browser, a messenger application, or other software or application. Client 102 can host and run under control of an operating system 104, such as a distribution of the Linux™ operating system, the Unix™ operating system, or other open-source or proprietary operating system. Operating system 104 can present and manage a user interface 106 to accept user inputs and commands, as well as provide an application space to execute applications and interface with hardware of client 102. User interface 106 can be or include a graphical user interface, a command line interface, a voice-activated or touch-screen interface, or other interface. Client 102 can contain or access resources including a data store 128, such as a local database stored on a hard drive or other storage.

According to some embodiments, client 102 can present a loop progress notification 108 via user interface 106. Loop progress notification 108 can reflect the progress or degree of completeness of a loop or other repetitive software process executing on client 102. In embodiments, the loop or other repetitive software process can be or include, for example, a repetitive software process, such as the encoding of an audio file, for instance in MPEG (Motion Pictures Expert Group) or other format. In embodiments, the loop or other repetitive software process can be incorporated or executed in application 110, such as a media player or recorder application, or other applications or software. Loop progress notification 108 can consist of an animated or graphical representation of the progress of a loop or other repetitive or iterative software process executing on client 102.

Loop progress notification 108 can be or include, for example, an animated bar graph representing the state of a loop or other repetitive software process of application 110 or other software. The loop progress notification 108 can indicate, again for example, the progress of the MPEG encoding of an audio file, with the length of the progress bar increasing in proportion to the amount of the audio file that has been successfully encoded by application 110, as that processing takes place. In embodiments, loop progress notification 108 can generate a completion message indicating that the loop or process is fully complete, for example by changing color or presenting a text message when the encoding of an MPEG audio file is complete and the bar graph reaches maximum length. Other graphical messages or states can be reflected in loop progress notification 108. Other types of encoding, as well as other software loops or processes can be reflected in loop progress notification 108. According to embodiments in one regard, loop progress notification 108 can be generated with the insertion of extended programming constructs into existing loop programming structures without a need for adding significant special-purpose code, as described herein.

Figure 2:
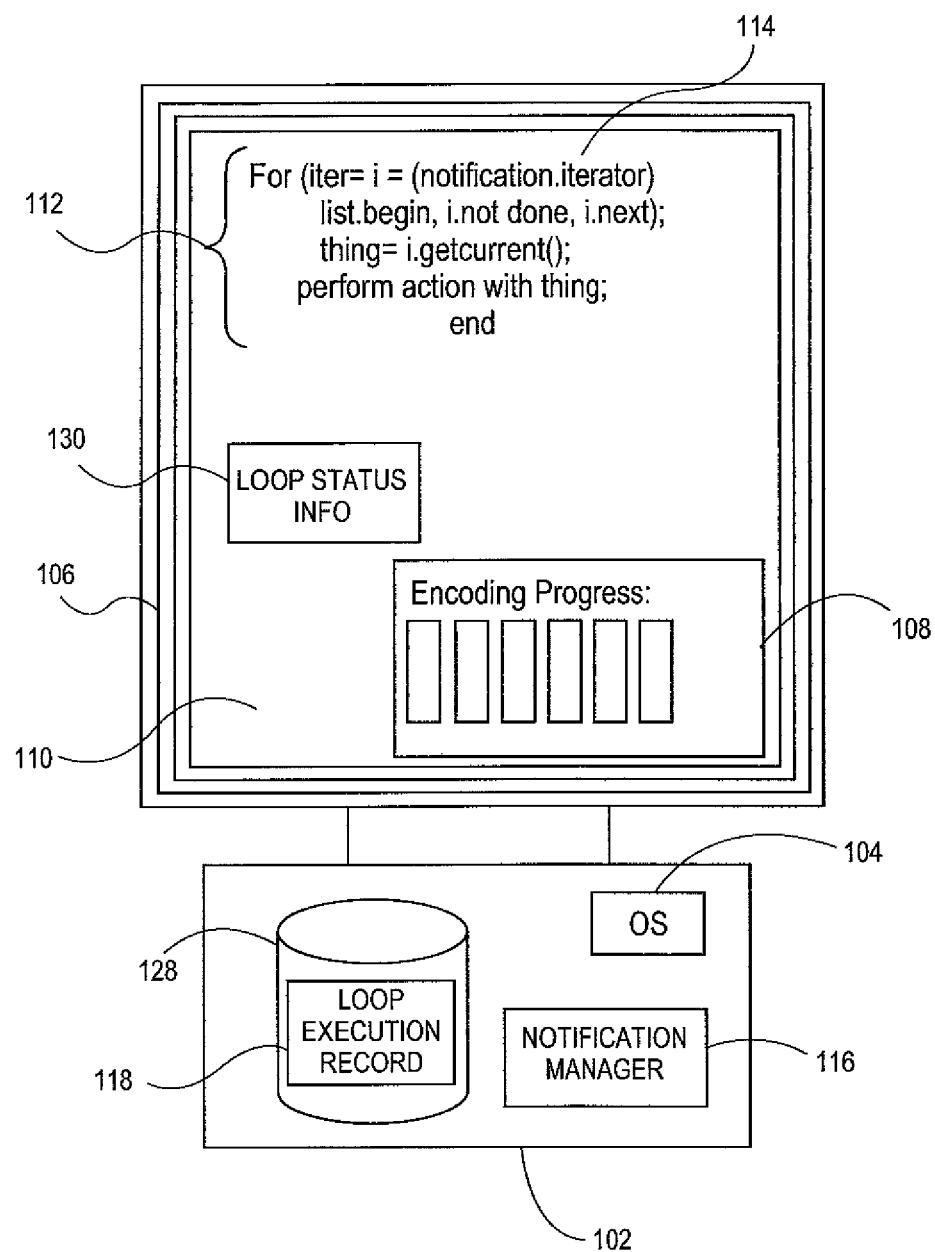
FIG. 2 illustrates an overall system for generating a progress notification in a software loop, according to various further embodiments.

More particularly, in embodiments as shown in FIG. 2, application 110 or other software executing on client 102 can incorporate loop code 112. Loop code 112 can comprise high-level source code, such as code, script, or instructions coded in C, C++, Java™, JavaScript™, Perl, ColdFusion, or other languages or platforms. Loop code 112 can comprise code that is compiled or assembled into lower-level or machine instructions. Loop code 112 can include a loop construct, such as an instruction in the general syntax of "until_ (condition) repeat loop," or "for_i=1 to n_perform_action," or other expressions or formats for performing an iterative software process.

Specifically, according to embodiments loop code 112 can incorporate a loop progress decorator 114. Loop progress decorator 114 can comprise an encoded logical operator, command or instruction that can be directly inserted in an in-line fashion into loop code 112, at the code level. The insertion of loop progress decorator 114 automatically invokes functions and/or services related to the tracking of the loop being executed in loop code 112. In embodiments as shown, loop progress decorator 114 can include an operator or instruction of the form "notification.iterator (inner_loop__counter)," or other encoded syntax or expression available to a programmer or user without a need to manually introduce other code definitions or customizations. In embodiments, loop progress decorator 114 can be encoded in one or more languages or platforms, such as Java™, JavaScript™, C++, or other languages, code or platforms. The following for example is an illustrative Python code implementation that can be used to establish an abstract base class for a loop progress decorator, according to embodiments:

TABLE 1

```
import sys
class Progress(object):
    """Abstract base class for a progress decorator.
    Takes an iterable object and wraps it so that iterations through
    it generate notifications as a side-effect"""
    def __init__(self, iterable):
        self.iterable = iterable
        # Detect determinate vs indeterminate progress
        if type(iterable) == type([ ]):
```

TABLE 1-continued

```
            self.expectedCount = len(iterable)
        elif hasattr(iterable, 'len'):
            self.expectedCount = len(iterable)
        elif hasattr(iterable, 'count'):
            self.expectedCount = iterable.count( )
        else:
            # indeterminate progress:
            self.expectedCount = None
    def __iter__(self):
        # Wrap the inner iterable:
        for (i, value) in enumerate(self.iterable):
            self.item(i)
            yield value
        self.end( )
    def item(self, index):
        # "Pure-virtual" hook to be called on each item
        raise NotImplementedError
    def end(self):
        # "Pure-virtual" hook to be called when the notification completes
        raise NotImplementedError
class TextProgress(Progress):
    """
    Concrete decorator subclass that implements the notifications by
    rendering a text-based progress bar on stdout
    """
    def __init__(self, iterable, stream=sys.stdout, width=50):
        Progress.__init__(self, iterable)
        self.stream = stream
        self.width = width
    def __write(self, index):
        if self.expectedCount is not None:
            # Determinate progress: render a growing line made of
            # hash characters, proportionate to the amount completed:
            position = int( float(selt.width) * float(index) /
            float(self.expectedCount) )
            self.stream.write('\r[' + ('#' * position) +
(' ' * (self.width-position) ) + '] %i/%i' % (index,
self.expectedCount) )
        else:
            # indeterminate progress: animate the hash going back and forward
            position = index % (self.width*2)
            if position > self.width:
                position = (self.width*2) – position
            self.stream.write('\r[' + (' ' * position) +
            '#' + (' ' * (self.width-position) ) +'] %i' % index)
        self.stream.flush( )
    def item(self, index):
        self.__write(index)
    def end(self):
        self.stream.write('\n')
if __name__ == '__main__':
    # Demo, rendering an indeterminate progress bar as a side-effect
    # of the iteration:
    for i in TextProgress(xrange(5000)):
        pass
# Demo, rendering a determinate progress bar as a side-effect
# of the iteration:
for i in TextProgress(range(500)):
    pass
```

Loop progress decorator 114 can in a further regard pass loop status information 130 related to loop code 112 in which it is inserted to a notification manager 116. Loop status information 130 can include the value of an iteration counter of loop code 112, indicating how many repetitions or passes through loop code 112 have been completed, and also indicating which iteration loop code 112 is currently executing. Notification manager 116 then generates loop progress notification 108 based on loop status information 130. Notification manager 116 can, for example, generate a thermometer-style progress bar which displays a bar extending 50% along the axis of a progress strip, when the iteration counter contained in loop status information 130 reaches iteration 50 out of 100. Other types of loop progress notification 108 can be generated, including, for instance, other types of animated linear representations of the degree or amount of progress through the loop of loop code 112. In embodiments, loop progress notification 108 can comprise a chart, trace, or other two-dimensional representation of the progress of loop code 112. Other types of notification, such as an audible notification of progress, can also be used.

The introduction of a loop progress decorator 114 and generation of a loop progress notification 108 permits a programmer or user to automatically generate a view of the in-process progress of a loop or other repetitive or iterative process, as that process takes place. A programmer or others can thereby conveniently incorporate a loop tracking function with notification to a user invoking that loop without preparing significant additional or special-purpose code, to permit the real-time observation of any loop or other repetitive or iterative software process invoking those resources.

As shown in FIG. 2, notification manager 116 can also capture and store a loop execution record 118, and store that record to data store 128. Loop execution record 118 contains data related to the state and progress of loop code 112, as well as execution states of the processor, memory, and other hardware or resources of client 102 during the course of execution of loop code 112. Loop execution record 118 can contain, for example, the execution time for each iteration of loop code 112, whether an error state has been encountered by the processor or memory of client 102, or other status information for the loop code 112, client 102, application 110, or other hardware or software. Loop execution record 118 can be used for instance to debug loop code 112 or other software in the event of a crash or other anomaly, including to determine the identity of a loop repetition at which a crash occurred and/or the state of client 102, loop code 112, application 110, or other hardware or software at that time. Loop execution record 118 can further be used to optimize the execution time or other performance characteristics of loop code 112. Notification manager 116 can, in embodiments, also or instead output loop execution record 118 and other information to other media or destinations, such as to print out loop execution record 118, or upload loop execution record 118 to a remote Web site. It may be noted that in embodiments, notification manager 116 can be integrated in operating system 104, while in further embodiments notification manager 116 can be hosted in other software or resources.

Figure 3:
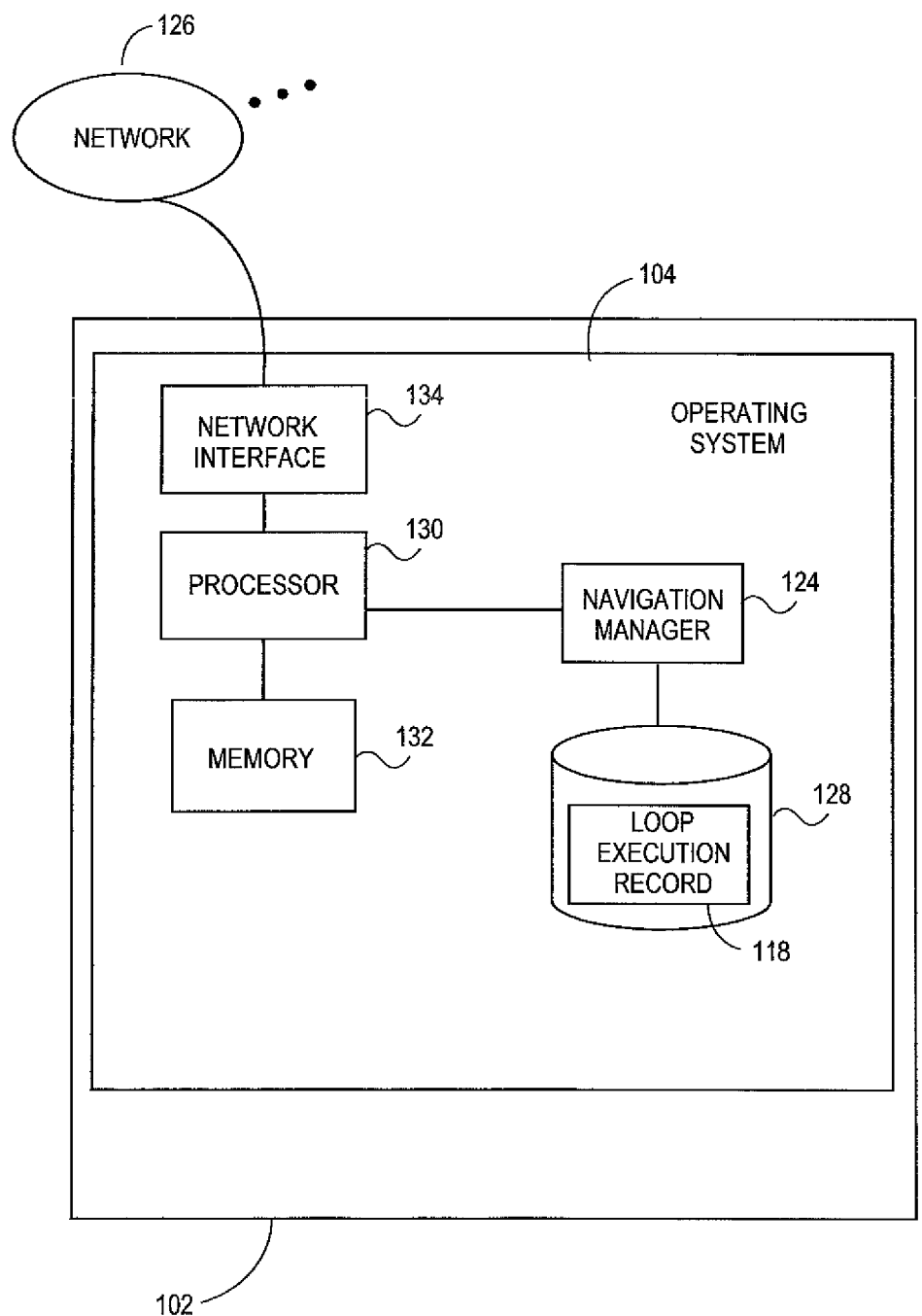
FIG. 3 illustrates an illustrative hardware configuration that can be used in systems for generating a progress notification in a software loop, according to various embodiments.

FIG. 3 illustrates an illustrative configuration of hardware and other resources incorporated in client 102, according to various embodiments. In embodiments as shown, client 102 can comprise a processor 120 communicating with memory 122, such as electronic random access memory, operating under control of or in conjunction with operating system 104. Processor 120 also communicates with data store 118, which in turn can store loop execution record 118 and other data. Processor 120 further communicates with notification manager 116. In embodiments processor 120 can communicate with network interface 134, such as an Ethernet or wireless data connection, which in turn communicates with network 126, such as the Internet or other public or private networks. Other configurations of client 102 are possible.

Figure 4:
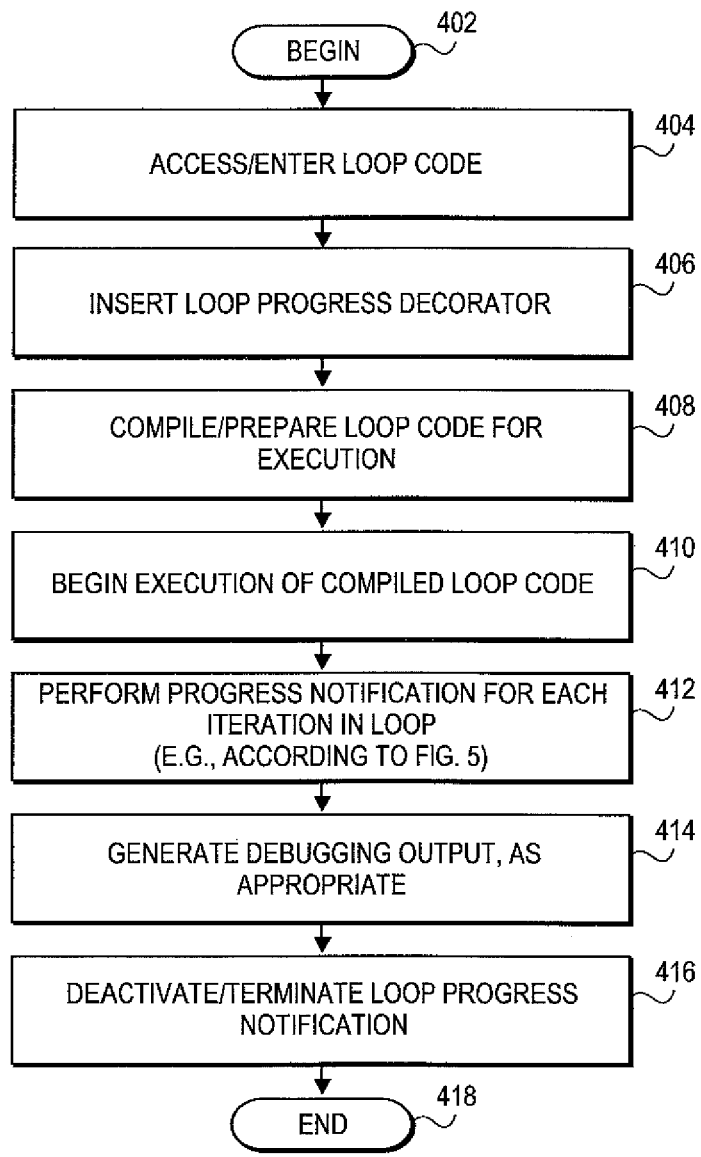
FIG. 4 illustrates a flowchart of overall progress notification processing, according to various embodiments.

FIG. 4 illustrates overall loop processing and the generation of loop progress notification, according to embodiments of the present teachings. In step 402, processing can begin. In step 404, a programmer or user can access or enter a set of loop code 112, such as software code programmed in C, C++, or other code, languages, or platforms. In step 406, the programmer or user can insert loop progress decorator 114 in loop code 112. In embodiments, loop progress decorator 114 can for instance be automatically inserted during the compilation process of a compiler.

In step 408, the loop code 112 can be compiled, assembled, or otherwise prepared or translated for execution or further processing. In step 410, the execution of compiled loop code 112 can begin. In step 412, an in-loop or realtime progress notification is performed for each loop, for example according to processing shown in the flow diagram for FIG. 5.

In step 414, the notification manager 116 can generate debugging information from loop execution record 118, as appropriate. Notification manager 116 can for instance generate a log of the state of application 110, processor 120, memory 122, or other software, hardware, or other resources of client 102 during an iterations of loop code 112 during which a crash or hang is encountered. According to embodiments in one regard, such debugging information can be used to detect and analyze errors or anomalies in loop code 112 or other software or code. The state of the loop code 112 or other hardware or software can, for example, recorded and examined to locate a logical error causing loop code 112 to crash or halt during a specifically-identified loop iteration or state. In embodiments, loop execution record 118 can be used to indicate other information, such as the relative speed or performance of loop code 112 depending on input data, memory usage, or other factors. In step 416, the loop progress notification 108 can be terminated or deactivated, upon completion of processing and logging the activity of loop code 112. In step 418, processing can repeat, return to a prior processing point, jump to a further processing point or end, as understood by persons skilled in the art.

Figure 5:
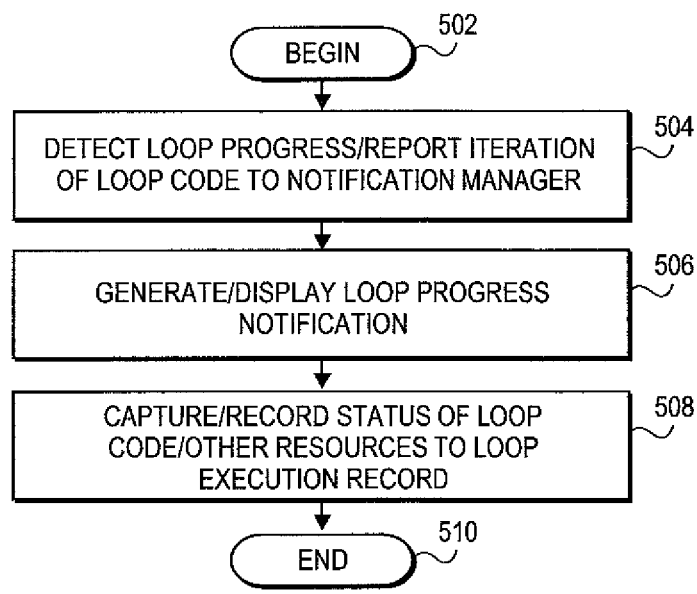
FIG. 5 illustrates a flowchart of loop progress notification processing related to individual loops, according to various embodiments.

FIG. 5 illustrates loop progress notification processing for individual loops or iterations of loop code 112. In step 502, processing can begin. In step 504, the loop progress of loop code 112 is detected via loop progress decorator 114 communicating with notification manager 116. In embodiments, loop progress decorator 114 can report the number or iteration value of the current increment of loop code 112 being executed to notification manager 116.

In step 506, notification manager 116 generates and displays loop progress notification 108 via user interface 106. Loop progress notification 108 can be or include, for example, an animated bar graph, bullet graph, thermometer bar, or other visual or graphical representation of the state of loop code 112 and its progress. In embodiments, loop progress notification can comprise other types of notification or alerts, for example, an audible tone that rises or changes as loop code 112 progresses. Other types of notification to the programmer or user of the progress of loop code 112 are possible.

In step 508, the notification manager 116 can capture and/or record the status of the loop code 112 and other processing activity of client 102 in loop execution record 118. Loop execution record 118 can contain the loop iteration number or value of loop code 112 for each successful loop, as well as the execution state and/or values of application 110, processor 120, memory 122, or other hardware or software of client 102. Notification manager 116 can store loop execution record 118 to data store 128 or other location. After step 508, progress notification processing for an individual loop of loop code 112 can be completed and processing can be proceed to step 510, where processing can processing can repeat, return to a prior processing point, jump to a further processing point, or end, as understood by persons skilled in the art.

The foregoing description is illustrative, and variations in configuration and implementation may occur to persons skilled in the art. For example, while embodiments have been generally described in which loop code 112 is integrated in or forms a part of an application 110, in embodiments loop code 112 need not be embedded within an application. Loop code 112 can, for instance, be located in operating system 104, within a utility, can be self-standing code, or be located or compiled within other resources of client 102. Similarly, while the loop progress notification 108 has, in embodiments, generally been described as reflecting the progress through a set of loop code 112, in embodiments loop progress notification or other notification services can report the progress through repetitive software processes that are not reflected in a "do-loop" type programming syntax. For example, loop progress decorator 114 can be embedded in a recursive function call. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
executing a repetitive software process by a processing device, wherein an encoded progress operator is configured in an execution path of the repetitive software process, the repetitive software process comprising a set of loop code that repeats at least one of a computation or a logical operation until a criterion is fully satisfied;
capturing progress information from the repetitive software process by the processing device using the encoded progress operator during execution of the repetitive software process, the progress information indicating a number of repetitions of at least one of the computation or the logical operation that have been completed;
communicating the progress information to a notification manager; and
generating a progress notification representing a state of progress of the repetitive software process.

2. The method of claim 1, wherein the set of loop code is embedded in an application.

3. The method of claim 1, wherein the progress notification comprises a graphical representation of a degree of progress in the repetitive software process.

4. The method of claim 3, wherein the graphical representation comprises at least one of a thermometer bar or a bullet graph.

5. The method of claim 4, wherein the notification manager stores the progress information to a loop execution record.

6. The method of claim 5, further comprising debugging or optimizing the set of loop code based on the loop execution record.

7. The method of claim 6, further comprising printing the loop execution record.

8. The method of claim 1, wherein the repetitive software process comprises a recursive function.

9. A system for generating a progress notification for a repetitive software process, comprising:
a memory to store instructions for the repetitive software process; and
a processing device, coupled to the memory, wherein the processing device is configured to:
execute the repetitive software process, wherein an encoded progress operator is configured in an execution path of the repetitive software process, the repetitive software process comprising a set of loop code that repeats at least one of a computation or a logical operation until a criterion is fully satisfied;
capture progress information from the repetitive software process using the encoded progress operator during execution of the repetitive software process, the progress information indicating a number of repetitions of at least one of the computation or the logical operation that have been completed; and
generate a progress notification representing a state of progress of the repetitive software process.

10. The system of claim 9, wherein the set of loop code is embedded in an application.

11. The system of claim 9, wherein the progress notification comprises a graphical representation of a degree of progress in the repetitive software process.

12. The system of claim 11, wherein the graphical notification comprises at least one of a thermometer bar or a bullet graph.

13. The system of claim 12, wherein the processing device is further configured to store the progress information to a loop execution record.

14. The system of claim 13, wherein the processing device is further configured to print the loop execution record.

15. The system of claim 9, wherein the repetitive software process comprises a recursive function.

16. A non-transitory computer-readable medium, the computer-readable medium being readable to execute operations comprising:
executing a repetitive software process by a processing device, wherein an encoded progress operator is configured in an execution path of the repetitive software process, the repetitive software process comprising a set of loop code that repeats at least one of a computation or a logical operation until a criterion is fully satisfied;
capturing progress information from the repetitive software process by the processing device using the encoded progress operator during execution of the repetitive software process, the progress information indicating a number of repetitions of at least one of the computation or the logical operation that have been completed;
communicating the progress information to a notification manager; and
generating a progress notification representing a state of progress of the repetitive software process.

17. The non-transitory computer-readable medium of claim 16, wherein the progress notification comprises a graphical representation of a degree of progress in the repetitive software process.

18. The non-transitory computer-readable medium of claim 17, wherein the graphical representation comprises at least one of a thermometer bar and a bullet graph.

19. The non-transitory computer-readable medium of claim 16, wherein the repetitive software process comprises a recursive function.

20. A progress notification, the progress notification being generated by a method comprising:
executing a repetitive software process by a processing device, wherein an encoded progress operator is configured in an execution path of the repetitive software process, the repetitive software process comprising a set of loop code that repeats at least one of a computation or a logical operation until a criterion is fully satisfied;
capturing progress information from the repetitive software process by the processing device using the encoded progress operator during execution of the repetitive software process, the progress information indicating a number of repetitions of at least one of the computation or the logical operation that have been completed;
communicating the progress information to a notification manager; and
generating the progress notification representing a state of progress of the repetitive software process.

21. The progress notification of claim 20, wherein the progress notification comprises a graphical representation of a degree of progress in the repetitive software process.

22. The progress notification of claim 21, wherein the graphical representation comprises at least one of a thermometer bar and a bullet graph.

23. The progress notification of claim 20, wherein the repetitive software process comprises a recursive function.

\* \* \* \* \*